United States Patent
Shimura et al.

(10) Patent No.: US 12,548,291 B2
(45) Date of Patent: Feb. 10, 2026

(54) VIDEO SIGNAL PROCESSING APPARATUS, VIDEO SIGNAL PROCESSING METHOD, AND IMAGING APPARATUS

(71) Applicant: SONY GROUP CORPORATION, Tokyo (JP)

(72) Inventors: Hideki Shimura, Kanagawa (JP); Koji Kamiya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 517 days.

(21) Appl. No.: 17/928,454

(22) PCT Filed: Jun. 23, 2021

(86) PCT No.: PCT/JP2021/023749
§ 371 (c)(1),
(2) Date: Nov. 29, 2022

(87) PCT Pub. No.: WO2022/004518
PCT Pub. Date: Jan. 6, 2022

(65) Prior Publication Data
US 2023/0215131 A1     Jul. 6, 2023

(30) Foreign Application Priority Data
Jun. 30, 2020   (JP) ................................. 2020-113488

(51) Int. Cl.
*G06V 10/60*     (2022.01)
*G06T 5/90*     (2024.01)
*H04N 23/741*     (2023.01)

(52) U.S. Cl.
CPC ................ *G06V 10/60* (2022.01); *G06T 5/90* (2024.01); *H04N 23/741* (2023.01); *G06T 2207/20208* (2013.01)

(58) Field of Classification Search
CPC . G06V 10/60; G06T 2207/20208; G06T 5/92; G06T 2207/10016; H04N 5/66
See application file for complete search history.

(56) References Cited

U.S. PATENT DOCUMENTS

2018/0130188 A1 *   5/2018   Farrell ...................... G06T 7/90
2020/0007735 A1 *   1/2020   Kamiya ................. H04N 23/76
(Continued)

FOREIGN PATENT DOCUMENTS

JP     2005341243 A   *   12/2005
JP     2014-518024 A     7/2014
(Continued)

*Primary Examiner* — Stephen R Koziol
*Assistant Examiner* — Ashley Hytrek
(74) *Attorney, Agent, or Firm* — Paratus Law Group, PLLC

(57) ABSTRACT

There is provided an imaging signal processing apparatus that includes: a first video signal processing unit that generates, from a pixel signal obtained by an imaging unit capable of obtaining a pixel signal with a first dynamic range, a luminance reduction video signal with a second dynamic range narrower than the first dynamic range; and a second video signal processing unit that generates, from the pixel signal, an information signal of a luminance change component of a luminance region of the luminance reduction video signal and a gain up signal of a pixel signal of the luminance region and adds the information signal and the gain up signal to the luminance reduction video signal.

11 Claims, 11 Drawing Sheets

(56) References Cited

U.S. PATENT DOCUMENTS

| | | | | |
|---|---|---|---|---|
| 2020/0242745 A1* | 7/2020 | Nashizawa | ............... | G06T 5/50 |
| 2023/0051479 A1* | 2/2023 | Aoki | ......................... | G06T 5/90 |

FOREIGN PATENT DOCUMENTS

| | | | | | |
|---|---|---|---|---|---|
| JP | 2016-195379 A | | 11/2016 | | |
| JP | 2020-017079 A | | 1/2020 | | |
| JP | 2020025241 A | * | 2/2020 | | |
| KR | 20100004329 A | * | 1/2010 | ............ | H04N 9/646 |
| WO | WO 2011/004222 A1 | | 1/2011 | | |
| WO | WO 2018/169003 A1 | | 9/2018 | | |

* cited by examiner

VIDEO SIGNAL PROCESSING APPARATUS, VIDEO SIGNAL PROCESSING METHOD, AND IMAGING APPARATUS

CROSS REFERENCE TO PRIOR APPLICATION

This application is a National Stage Patent Application of PCT International Patent Application No. PCT/JP2021/023749 (filed on Jun. 23, 2021) under 35 U.S.C. § 371, which claims priority to Japanese Patent Application No. 2020-113488 (filed on Jun. 30, 2020), which are all hereby incorporated by reference in their entirety.

TECHNICAL FIELD

The present technology relates to a video signal processing apparatus, a video signal processing method, and an imaging apparatus that processes a video signal obtained by an imaging apparatus such as a video camera.

BACKGROUND ART

In high dynamic range (HDR) imaging, video expression with a wide dynamic range is possible. It is also possible to express dark portions, high-luminance colors, and the like that cannot be expressed by a standard dynamic range (SDR) video signal with a standard dynamic range that can be displayed by a generally-used monitor.

As well-known technologies for HDR and LDR video signal processing, there are a technology of generating HDR video and LDR video at the same time (see Patent Literature 1), a technology of converting LDR video into HDR video (see Patent Literature 2), and the like. Here, the LDR is synonymous with the SDR.

Further, Patent Literature 3 has disclosed a technology of generating an information signal of a high-luminance change component for a high-luminance region as a contrast emphasis signal from a video signal captured by a camera capable of HDR imaging, generating a luminance reduction video signal with an SDR by reducing a luminance value of the high-luminance region of the captured video signal by knee processing for example, and obtaining an SDR video signal with the contrast of the high-luminance region emphasized by adding the contrast emphasis signal to the luminance reduction video signal.

CITATION LIST

Patent Literature

Patent Literature 1: Japanese Patent Application Laid-open No. 2016-195379
Patent Literature 2: WO 2011/04222
Patent Literature 3: WO 2018/169003

DISCLOSURE OF INVENTION

Technical Problem

However, no technology that provides sufficient visibility for a low-luminance portion of SDR video exists. Since the method of Patent Literature 3 is merely a method of adding the contrast emphasis signal of the high-luminance region of the video signal to the luminance reduction video signal, this method cannot provide an effect of improving the visibility of the low-luminance region.

It is an object of the present technology to provide a video signal processing apparatus, a video signal processing method, and an imaging apparatus capable of generating a video signal with visibility improved in terms of both contrast and brightness.

Solution to Problem

In order to solve the above-mentioned problem, a video signal processing apparatus as a first embodiment according to the present technology includes: a first video signal processing unit that generates, from a pixel signal obtained by an imaging unit capable of obtaining a pixel signal with a first dynamic range, a luminance reduction video signal with a second dynamic range narrower than the first dynamic range; and a second video signal processing unit that generates, from the pixel signal, an information signal of a luminance change component of a luminance region of the luminance reduction video signal and a gain up signal of a pixel signal of the luminance region and adds the information signal and the gain up signal to the luminance reduction video signal.

The first video signal processing unit may be configured to generate, from the pixel signal, the luminance reduction video signal by knee processing.

The second video signal processing unit may be configured to generate the gain up signal by multiplying the pixel signal of the luminance region of the luminance reduction video signal by a gain determined in accordance with a luminance value of the pixel signal.

The first dynamic range may be a high dynamic range (HDR), and the second dynamic range may be a standard dynamic range (SDR).

This video signal processing apparatus may further include a first output unit that outputs an output video signal generated by the second video signal processing unit.

The first output unit may be configured to output the output video signal to a view finder.

The second video signal processing unit may be further configured to be capable of generating, from the pixel signal, the information signal of the luminance change component of the luminance region of the luminance reduction video signal and generating an information signal of a luminance change component of a region belonging to a higher-luminance side as compared to the luminance region of the luminance reduction video signal.

The second video signal processing unit may be configured to add the generated information signal of the luminance change component of the region belonging to the higher-luminance side with the information signal of the luminance change component of the luminance region of the luminance reduction video signal and the gain up signal of the pixel signal of the luminance region to the luminance reduction video signal.

This video signal processing apparatus may further include a third video signal processing unit that generates, from the pixel signal obtained by the imaging unit, a video signal with the first dynamic range.

This video signal processing apparatus may further include a second output unit that outputs the video signal with the first dynamic range.

The second video signal processing unit may be configured to generate, from the pixel signal, an information signal of a luminance change component of a region belonging to a higher-luminance region as compared to the luminance region of the luminance reduction video signal and further add the information signal to the video signal with the first dynamic range.

A video signal processing method as a second embodiment according to the present technology includes:
generating, from a pixel signal obtained by an imaging unit capable of obtaining a pixel signal with a first dynamic range, a luminance reduction video signal with a second dynamic range narrower than the first dynamic range; and
generating, from the pixel signal, an information signal of a luminance change component of a luminance region of the luminance reduction video signal and a gain up signal of a pixel signal of the luminance region and adding the information signal and the gain up signal to the luminance reduction video signal.

An imaging apparatus as a third embodiment according to the present technology includes:
an imaging unit capable of obtaining a pixel signal with a first dynamic range;
a first video signal processing unit that generates, from the pixel signal obtained by the imaging unit, a luminance reduction video signal with a second dynamic range narrower than the first dynamic range; and
a second video signal processing unit that generates, from the pixel signal, an information signal of a luminance change component of a luminance region of the luminance reduction video signal and a gain up signal of a pixel signal of the luminance region and adds the information signal and the gain up signal to the luminance reduction video signal.

MODE(S) FOR CARRYING OUT THE INVENTION

Hereinafter, embodiments according to the present technology will be described with reference to the drawings.

First Embodiment

[General Configuration]

Figure 1:
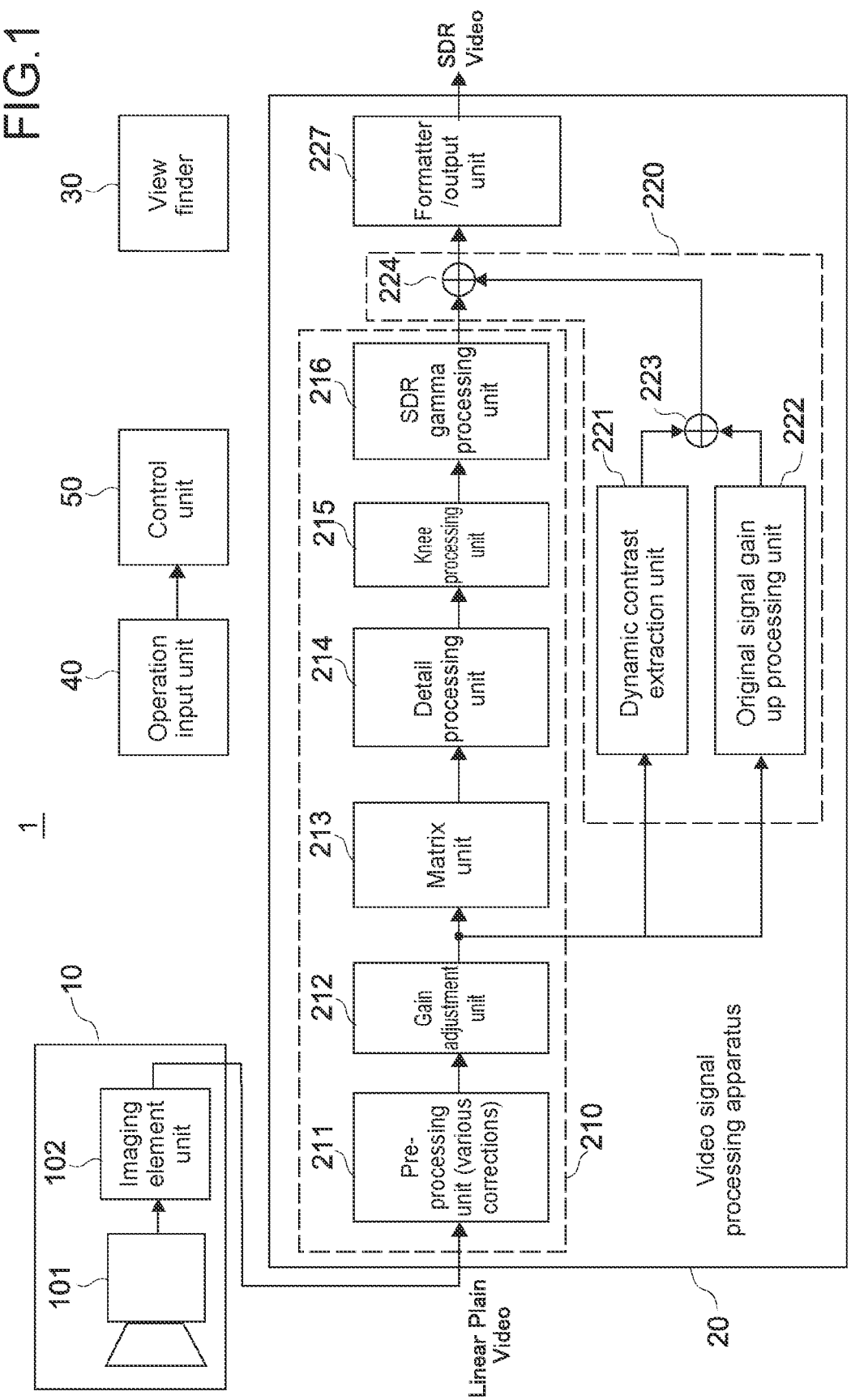
FIG. 1 A block diagram showing a configuration of an imaging system of a first embodiment according to the present technology.

FIG. 1 is a block diagram showing a configuration of an imaging system a first embodiment according to the present technology.

An imaging system 1 includes an imaging unit 10, a video signal processing apparatus 20, a view finder 30, an operation input unit 40, and a control unit 50.

The imaging unit 10 includes an optical block 101 and an imaging element unit 102.

The optical block 101 has a lens, a focus adjustment mechanism, a shutter mechanism, an aperture (iris) mechanism, and the like. The optical block 101 forms an image of reflected light from a subject on an imaging plane of an imaging element of the imaging element unit 102 with a lens. The imaging element unit 102 has an imaging element, an analog signal processing circuit, an A/D conversion circuit, and the like. The imaging element includes a charge coupled device (CCD) image sensor, a complementary metal oxide semiconductor (CMOS) image sensor, and the like. The imaging unit 10 is capable of obtaining a pixel signal with a relatively wide first dynamic range, for example, a high dynamic range (HDR).

The video signal processing apparatus 20 generates, from a pixel signal with a first dynamic range obtained by the imaging unit 10, a video signal with a second dynamic range narrower than the first dynamic range, such as an SDR, for example.

The video signal processing apparatus 20 includes a first video processing unit 210 and a second video processing unit 220.

The first video processing unit 210 has a pre-processing unit 211, a gain adjustment unit 212, a matrix unit 213, a detail processing unit 214, a knee processing unit 215, and an SDR gamma processing unit 216.

The pre-processing unit 211 performs, for example, signal correction processing such as defect correction and lens aberration correction on the pixel signal obtained by the imaging unit 10.

The gain adjustment unit 212 performs gain adjustment such as RGB gain adjustment for white balance adjustment.

The matrix unit 213 obtains color image data that is the first video signal with a first dynamic range by performing DeBayer processing, linear matrix processing, or the like on a pixel signal passing through the gain adjustment unit 212.

The detail processing unit 214 processes details with respect to the color image data that is the first video signal.

The knee processing unit 215 generates a luminance reduction video signal with a second dynamic range narrower than the first dynamic range by performing knee processing of the color image data that is the first video signal.

The SDR gamma processing unit 216 subjects the color image data with the second dynamic range to gamma processing for display on a display.

The second video processing unit 220 has a dynamic contrast extraction unit 221, an original signal gain up processing unit 222, a first adder 223, and a second adder 224.

The dynamic contrast extraction unit 221 generates an information signal of a luminance change component of a luminance region of the luminance reduction video signal as a contrast emphasis signal.

The original signal gain up processing unit 222 generates a signal obtained by multiplying the pixel signal of the luminance region of the luminance reduction video signal by a gain determined in accordance with the luminance value as a gain up signal.

The first adder 223 combines the contrast emphasis signal with the gain up signal.

The second adder 224 generates an output video signal by adding the composite signal of the contrast emphasis signal and the gain up signal output from the first adder 223 to the luminance reduction video signal with the second dynamic range generated by the first video processing unit 210.

A formatter/output unit 227 converts the output video signal output from the second adder 224 into a transmission format of SDR video and outputs it to the view finder 30, for example.

The SDR video can be transmitted to a camera control unit (CCU) or an external video device such as an external display through a camera cable other than the view finder 30.

The operation input unit 40 receives input of a variety of operation instructions, mode settings, and the like from a user. The operation input unit 40 includes a button, a switch, a dial, and a touch panel sensor provided on a VF-17 screen, for example.

The control unit 50 includes a central processing unit (CPU), a random-access memory (RAM), and a read only member (ROM). Programs to be executed by the CPU, various parameters, and the like are stored in the RAM or the ROM. The control unit 50 interprets information about user operation input received by the operation input unit 40 and controls the imaging system 1 in accordance with the interpreted input information.

[Regarding Problem]

Figure 2:
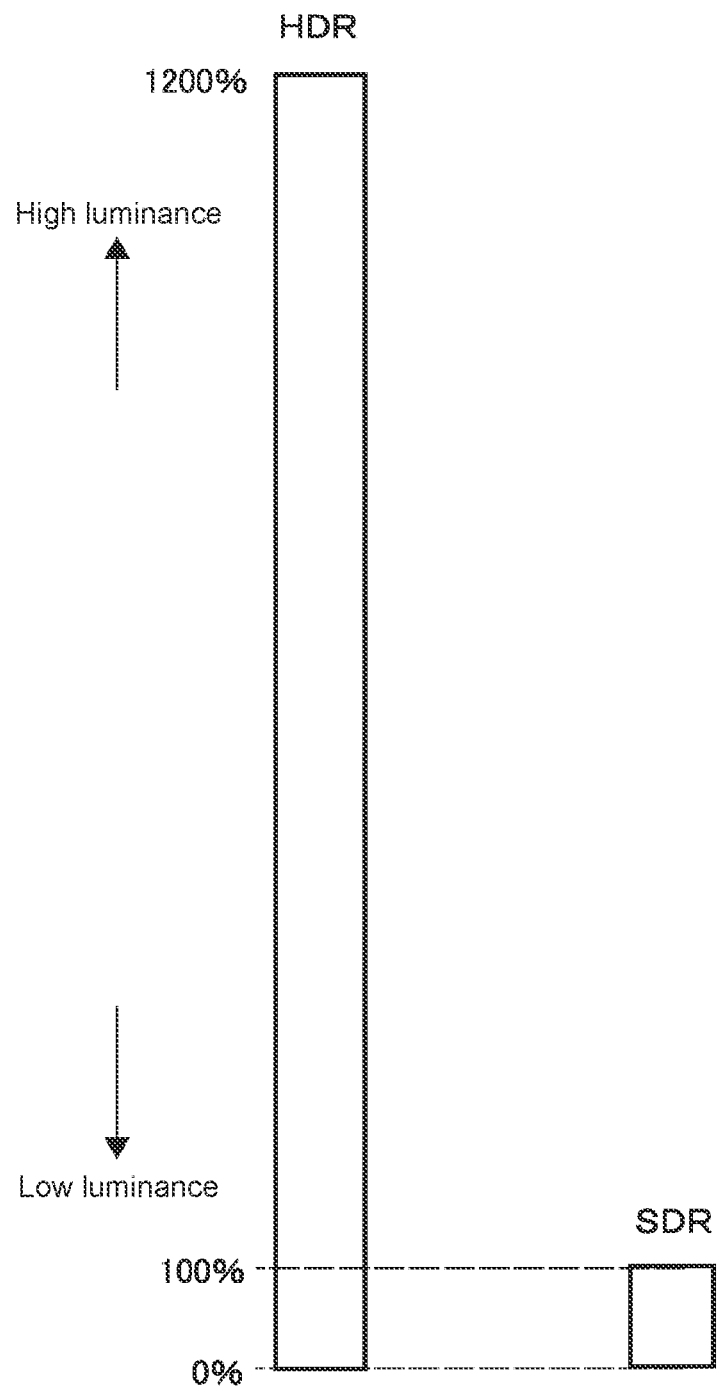
FIG. 2 A diagram showing an HDR and an SDR compared with each other.

FIG. 2 is a diagram showing the range of the HDR and the SDR compared with each other.

Figure 3:
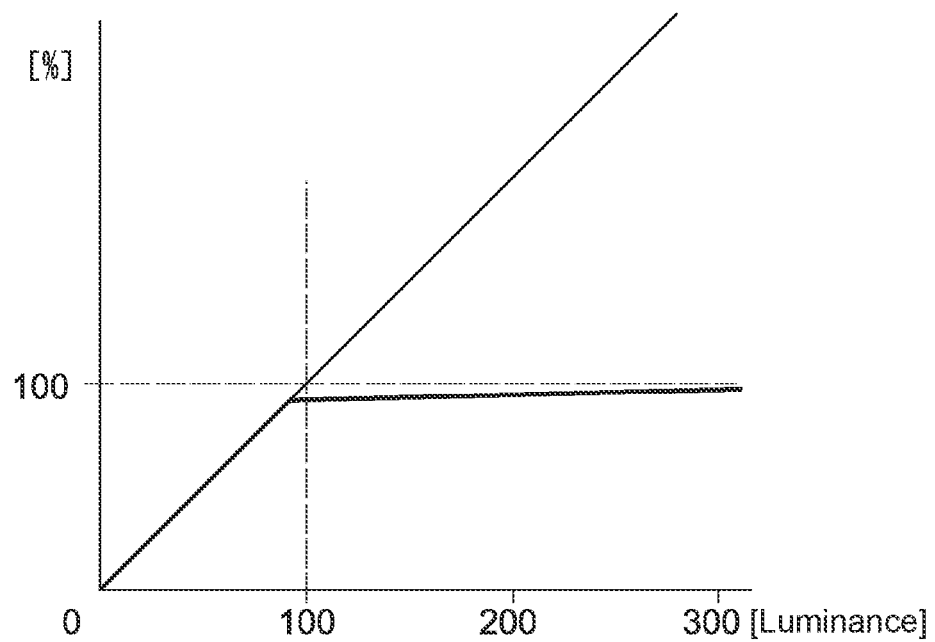
FIG. 3 A diagram showing knee correction for an HDR video signal.

Provided that the range of the SDR is 100%, the range of the HDR is 600% or 1200%, for example. As one of methods for generating an SDR video signal from an HDR video signal, there is a method of performing knee correction on the HDR video signal on the basis of a predetermined luminance value (knee correction point) as shown in FIG. 3. However, with this method, "clipped whites" in which the contrast of the high-luminance region of the video signal resulting from knee correction is significantly compressed and "blown-out highlights" caused by limits occur.

In view of this, there is a method of obtaining an SDR video signal with contrast of a high-luminance region emphasized by generating, from an original signal obtained by an imaging unit, an information signal of a high-luminance change component of a region on a higher-luminance side with respect to a knee correction point and adding it to a luminance reduction video signal with the SDR. However, this method cannot provide an effect of improving the visibility of a region other than the high-luminance region as a matter of course. In view of this, there can be a method of adding a contrast emphasis signal of a low-luminance region to a luminance reduction video signal with respect to the knee correction point. However, since an amount of change in luminance of the low-luminance region is smaller than that of the high-luminance region, it is difficult to improve the visibility of video of a dark portion significantly.

[Operations of Dynamic Contrast Extraction Unit 221 and Original Signal Gain Up Processing Unit 222]

Figure 4:
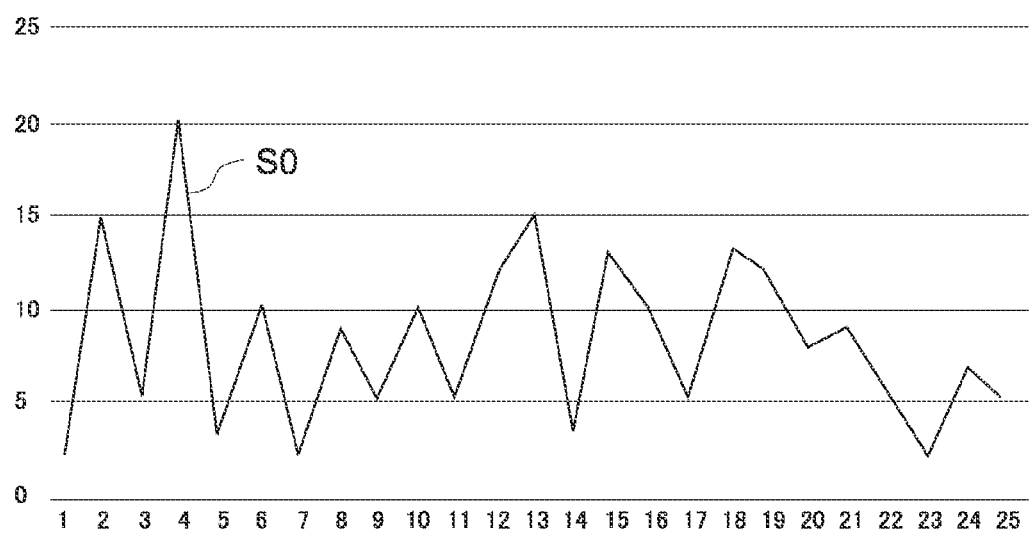
FIG. 4 A diagram showing a luminance waveform of a video signal (original signal) having low luminance input into a dynamic contrast extraction unit 221 and an original signal gain up processing unit 222.

FIG. 4 is a diagram showing a luminance waveform of an original signal S0 of a low-luminance region in a pixel signal (referred to as "original signal") input into the dynamic contrast extraction unit 221 and the original signal gain up processing unit 222. In the figure, the vertical axis indicates a luminance value (%) represented provided that the range of the SDR is 100% and the horizontal axis indicates time. In this example, the luminance value of the original signal S0 changes in a range of approximately 0% to 20%.

Figure 5:
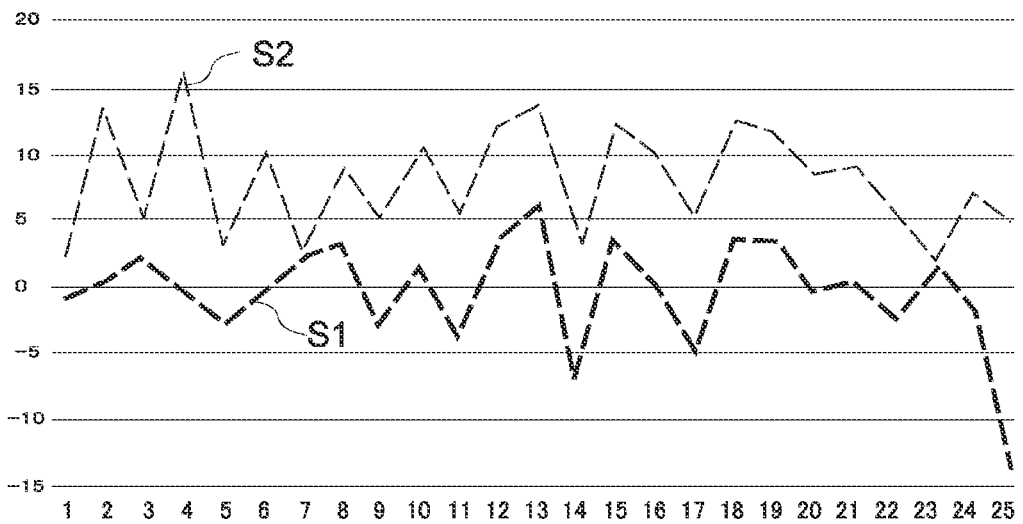
FIG. 5 A diagram showing a contrast emphasis signal S1 of a low-luminance region and a gain up signal S2 generated from the original signal shown in FIG. 4.

FIG. 5 is a diagram showing a contrast emphasis signal S1 that is information signal of a luminance change component generated by the dynamic contrast extraction unit 221 from the original signal S0 shown in FIG. 4 and a gain up signal S2 generated by the original signal gain up processing unit 222.

Figure 6:
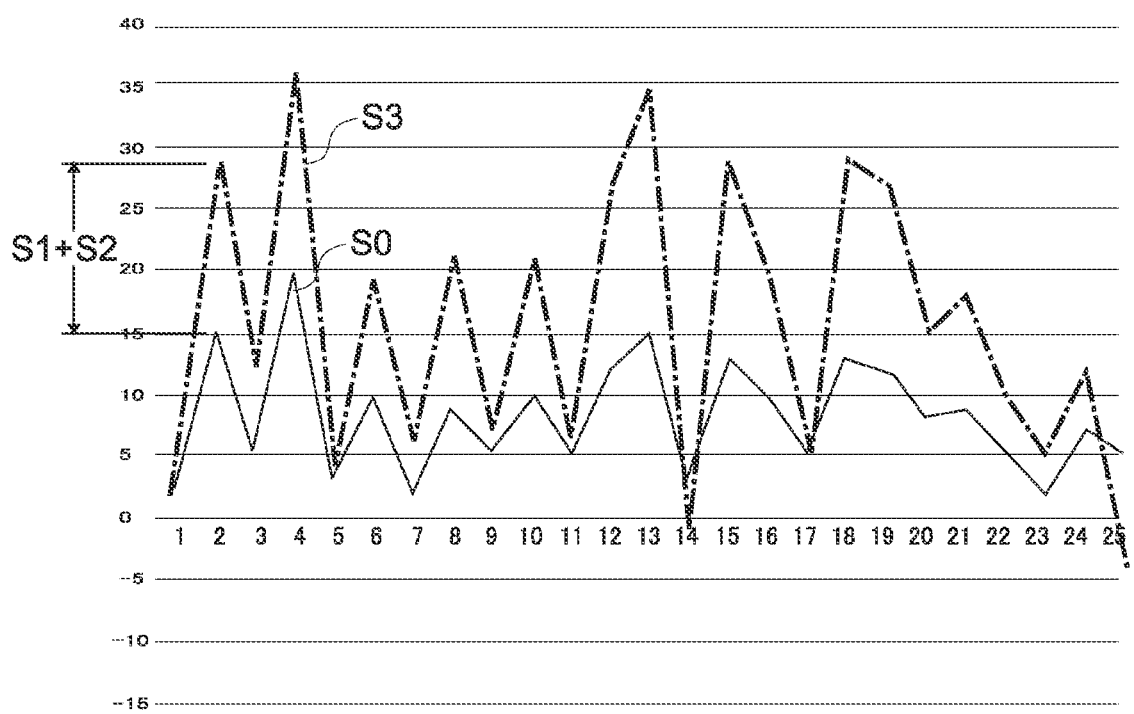
FIG. 6 A diagram showing an output video signal S3 obtained by adding the contrast emphasis signal S1 of the low-luminance region and the gain up signal S2 of FIG. 5 to an original signal S0 of FIG. 4.

FIG. 6 is a diagram showing an output video signal S3 obtained by adding the contrast emphasis signal S1 and the gain up signal S2 of FIG. 5 to the original signal S0 of FIG. 4.

By adding the contrast emphasis signal S1 and the gain up signal S2 to the original signal S0 in this manner, an SDR video signal with visibility improved in terms of both contrast and brightness can be generated. Accordingly, the visibility of the SDR video displayed on the view finder 30 or the like, for example, and the focus accuracy for the dark portion of the video can be improved.

[Regarding Gain of Original Signal Gain Up Processing Unit 222]

Figure 7:
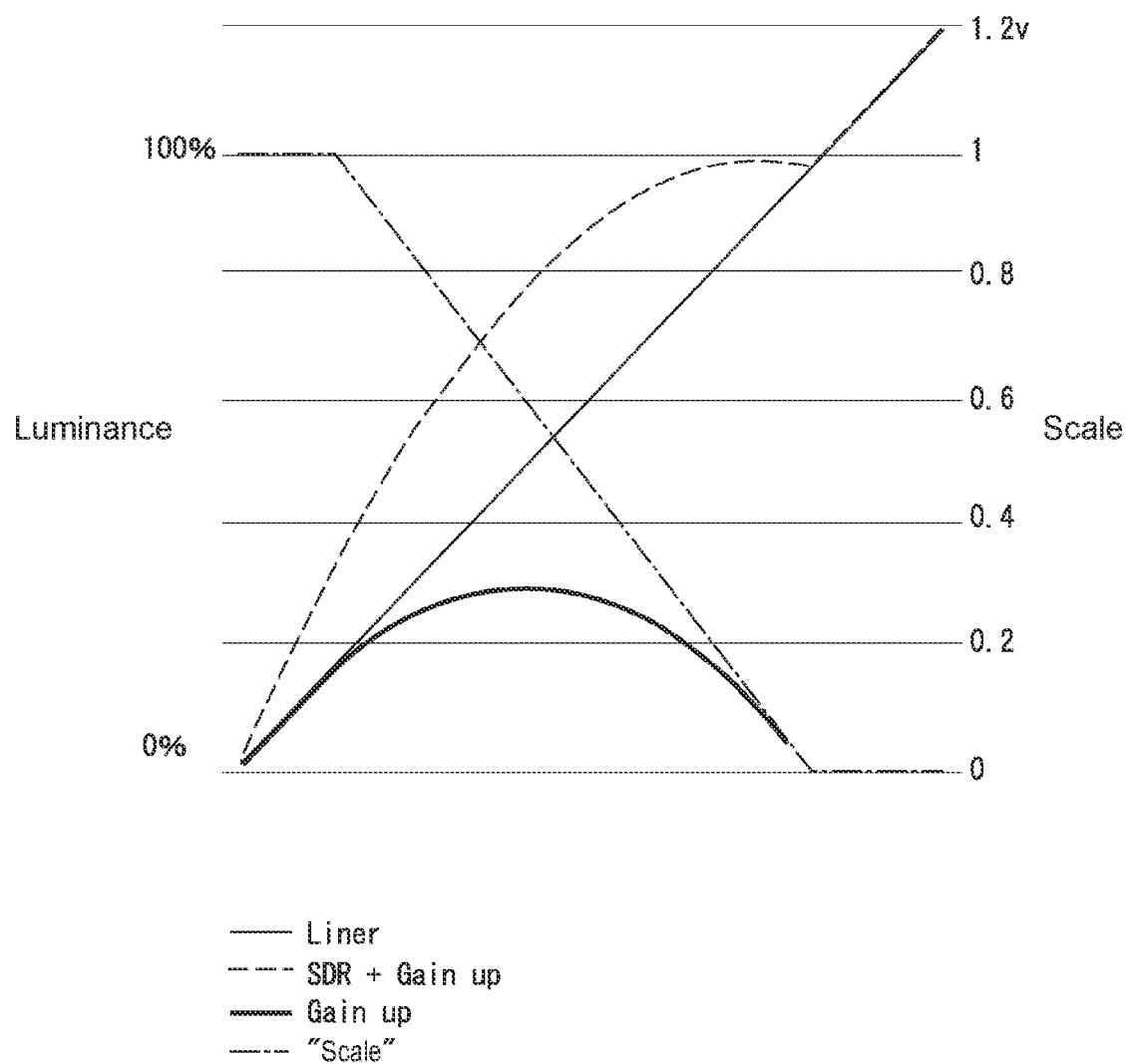
FIG. 7 A graph showing an example of a relationship between a luminance value of an original signal S0 and the gain up signal S2 and a gain scale.

As described above, the original signal gain up processing unit 222 generates the signal obtained by multiplying the pixel signal by the gain determined in accordance with the luminance value of the pixel signal to avoid exceeding of the luminance value of the output video signal as the gain up signal. Here, a gain determined depending on the luminance value of the pixel signal will be described. FIG. 7 is a graph showing an example of a relationship between the luminance value of the original signal S0 and the gain up signal S2 and a gain scale. For example, regarding the original signal S0 of the luminance region with luminance of approximately 0% to 10%, one obtained by multiplying the original signal S0 by 1 is the gain up signal S2. For example, regarding the original signal S0 of the luminance region with luminance of approximately 10 to 60%, one obtained by multiplying the original signal S0 by 0 to 1 is the gain up signal S2. By setting the relationship between the luminance value of the original signal S0 and the gain up signal S2 and the gain scale in this manner, it is possible to prevent the video from looking unnatural due to the luminance value as a result of adding the gain up signal S2 to the luminance value of the original signal S0.

Figure 8:
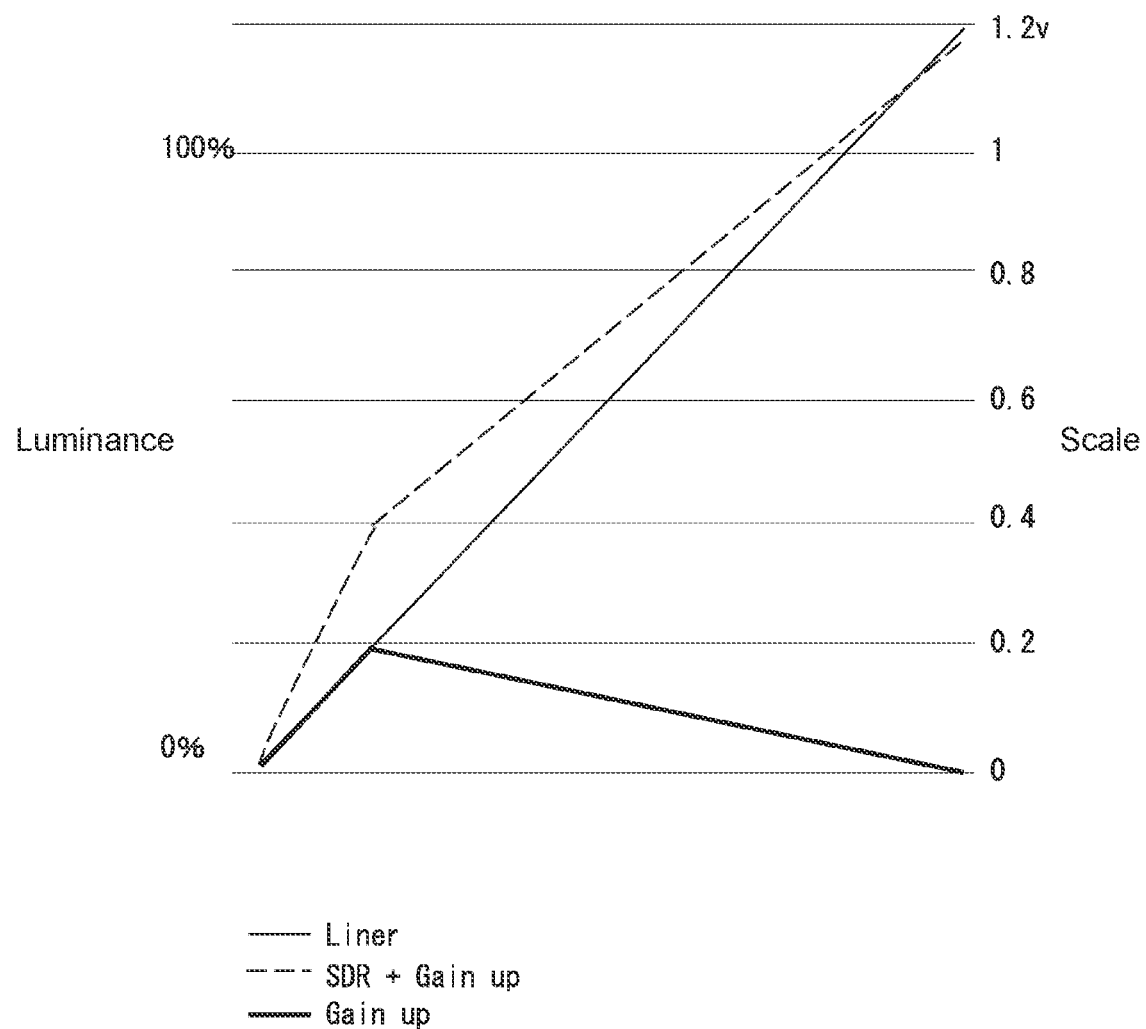
FIG. 8 A diagram showing another method of setting a gain scale.

Alternatively, as shown in FIG. 8, a result of multiplying the original signal S0 by 1 is set as the gain up signal S2 for the luminance region with luminance of approximately 0 to 10% and a gain scale obtained by subtracting $\frac{1}{8}x$ from 1 where x is the luminance (%) of the original signal may be set for the original signal S0 for the luminance region with luminance of approximately 10 to 60%. In this case, as compared to the method of FIG. 7, the gain up signal S2 of the luminance region with luminance of approximately 10 to 60% can be reduced averagely, and it is easy to manage the avoidance of exceeding of the luminance value obtained by adding the gain up signal S2 to the luminance value of the original signal S0.

First Modified Example

Figure 9:
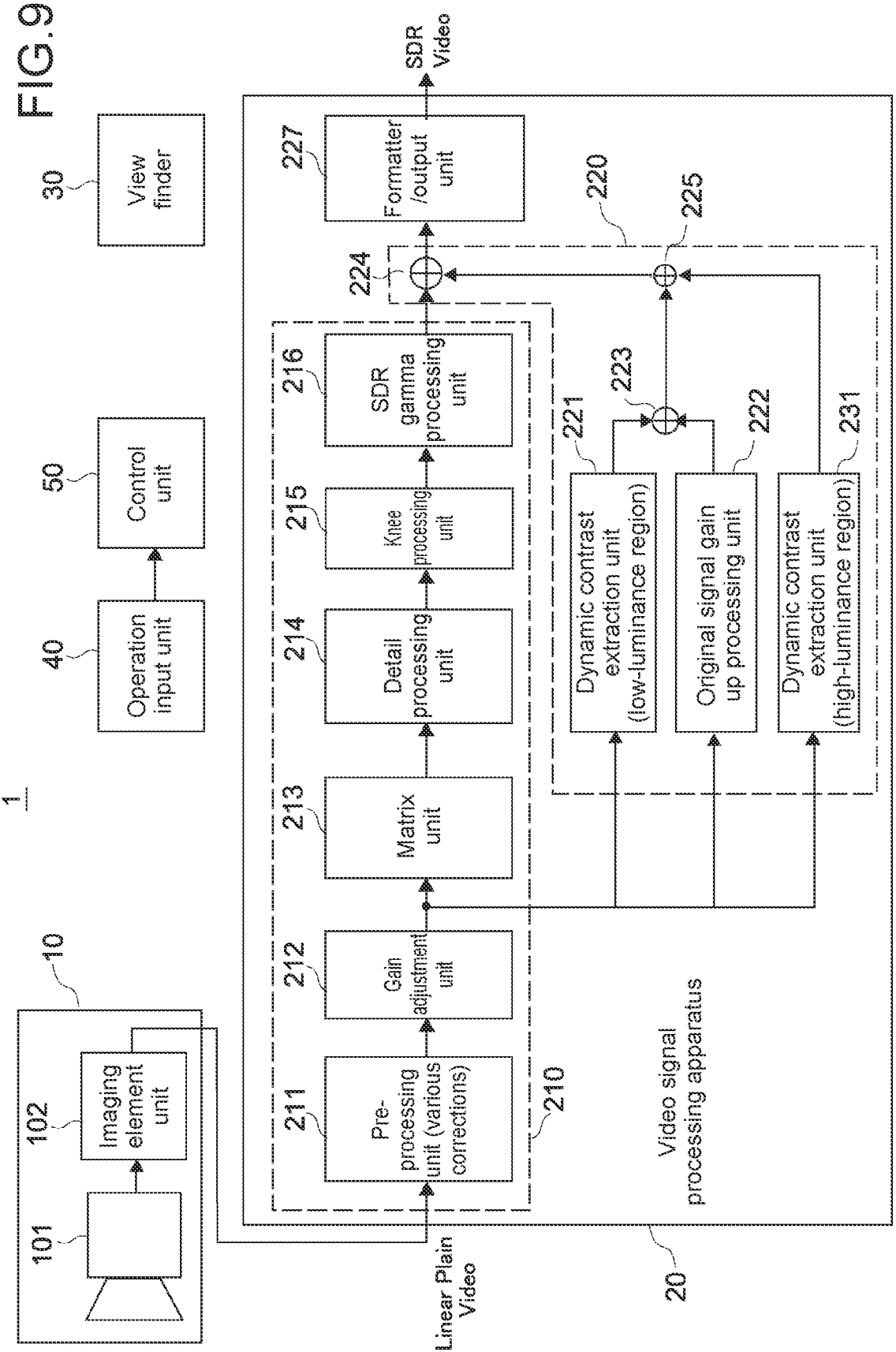
FIG. 9 A diagram showing of a first modified example of the imaging system.

FIG. 9 shows the imaging system 1 according to the above-mentioned embodiment to which a dynamic contrast extraction unit 231 for a high-luminance region is added. The dynamic contrast extraction unit 231 for the high-luminance region generates an information signal of a high-luminance change component of a region belonging to a higher-luminance side with respect to the knee correction point, for example, a highest-luminance region as a contrast emphasis signal. The contrast emphasis signal generated by the dynamic contrast extraction unit 231 for the high-luminance region is further added by a third adder 225 to a signal obtained by adding a contrast emphasis signal generated by a dynamic contrast extraction unit 221 for the low-luminance region and a gain up signal generated by the original signal gain up processing unit 222. This addition signal is added by a second adder 224 to the luminance reduction video signal generated by the first video processing unit 210. Then, the addition signal is output to the view finder 30 or the like through the formatter/output unit 227 as an SDR video signal.

With this configuration, the visibility of video of both the region on the lower-luminance side and the region on the higher-luminance side with respect to the knee correction point can be improved. It is possible to improve the visibility of the video of the region on the higher-luminance side where light up is done while adjusting the focus on the region on the lower-luminance side when imaging a dark portion for example.

Second Modified Example

Figure 10:
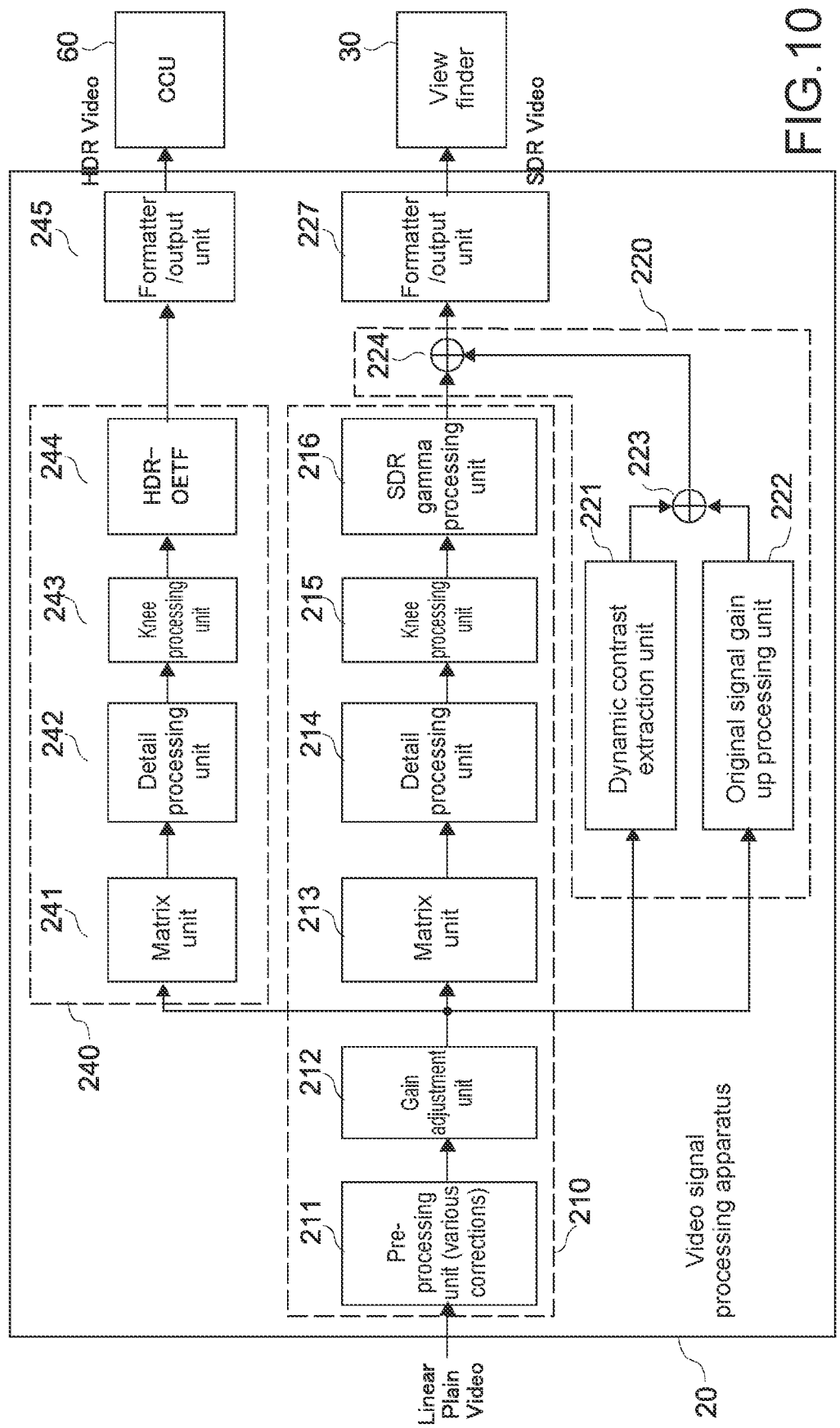
FIG. 10 A diagram showing of a second modified example of the imaging system.

FIG. 10 shows the imaging system 1 according to the above-mentioned embodiment to which a third video processing unit 240 is added. The third video processing unit 240 generates an HDR video signal from a pixel signal obtained by the imaging apparatus. The third video processing unit 240 has a matrix unit 241, a detail processing unit 242, a knee processing unit 243, an OETF unit 244, and a formatter/output unit 227.

The matrix unit 241 obtains color image data by performing DeBayer processing, linear matrix processing, or the like on a pixel signal passing through the gain adjustment unit 212.

The detail processing unit 242 processes details of the color image data.

The knee processing unit 243 performs knee processing on the color image data.

The OETF unit 244 performs gradation compression with an optical-electro transfer function (OETF) for the HDR with respect to the color image data and performs gamma signal processing.

A formatter/output unit 245 converts the color image data passing through the OETF unit 244 into a transmission format of HDR video.

The HDR video signal generated by the third video processing unit 240 is transmitted to a camera control unit (CCU) or an external video device such as an external display through a camera cable as main video.

In the imaging system to which the third video processing unit 240 is added as described above, the contrast emphasis signal generated by the dynamic contrast extraction unit 231 for the high-luminance region may be added by an adder 225 to the HDR video signal generated by the third video processing unit 240. Accordingly, the HDR video signal with contrast emphasized is obtained.

Third Modified Example

[Regarding Mode Setting]

In the imaging system 1 described above, as for generation of the above-mentioned contrast emphasis signal and gain up signal, the control unit 50 controls, for example, on/off of the gain up function, the contrast emphasis function for the low-luminance region, and the contrast emphasis function for the high-luminance region by the user selecting a mode.

A user interface (UI) screen for the user setting is displayed on the view finder 30. As for this UI, the user can input settings through the operation input unit 40 for example. The input settings are received and retained by the control unit 50.

The mode includes a general contrast emphasis mode, a contrast emphasis mode for a high-luminance region, a contrast emphasis mode for a region other than the high-luminance region, a contrast emphasis mode for a low-luminance region, a contrast emphasis mode for the high-luminance region+the low-luminance region, and the like.

(General Contrast Emphasis Mode)

On the general contrast emphasis mode, contrast components are generated with respect to all luminance regions (all regions on the lower-luminance side and the higher-luminance side with respect to the knee correction point).

Figure 11:
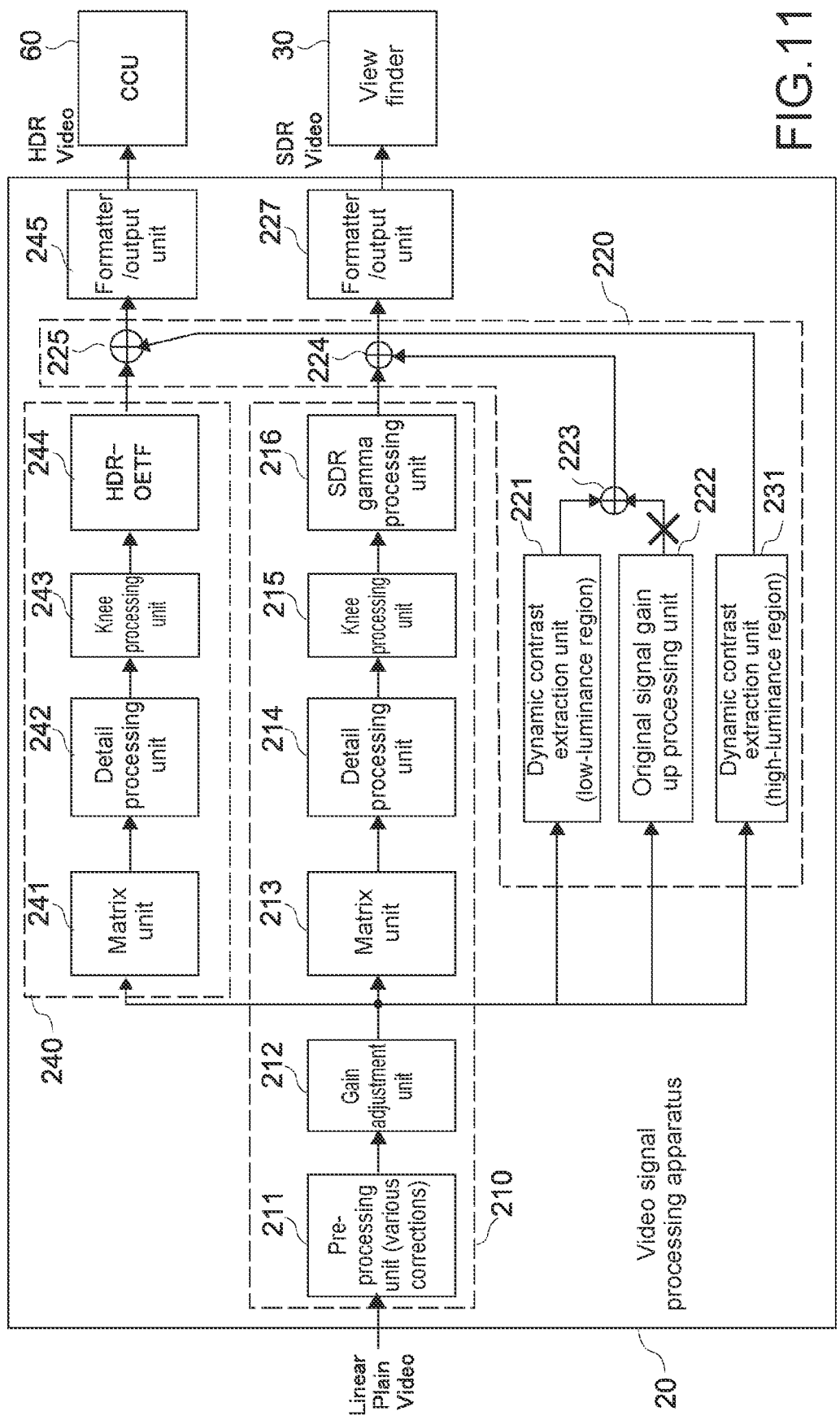
FIG. 11 A diagram showing a state of a video signal processing apparatus 20 on a general contrast emphasis mode.

FIG. 11 is a diagram showing a state of the video signal processing apparatus 20 on the general contrast emphasis mode. On the general contrast emphasis mode, the dynamic contrast extraction unit 221 for the low-luminance region is set by the control unit 50 to generate contrast emphasis signals of all regions on the lower-luminance side with respect to the knee correction point. On the other hand, the dynamic contrast extraction unit 231 for the high-luminance region is set by the control unit 50 to generate contrast emphasis signals of all regions on the higher-luminance side with respect to the knee correction point. Further, the original signal gain up processing unit 222 is turned off. The contrast emphasis signals generated by the dynamic contrast extraction unit 221 for the low-luminance region are added to the video signal generated by the first video processing unit 210. The contrast emphasis signals generated by the dynamic contrast extraction unit 231 for the high-luminance region are added to the video signal generated by the third video processing unit 240. By adding the contrast components to the video signal with respect to all luminance regions in this manner, it is possible to avoid blown-out highlights in a scenario with strong sunlight or the like.

(Contrast Emphasis Mode for High-Luminance Region)

The contrast emphasis mode for the high-luminance region is a mode of adding contrast components of the region belonging to the higher-luminance side with respect to the knee correction point, for example, the highest-luminance region to the output video signal of the first video processing unit 210.

Figure 12:
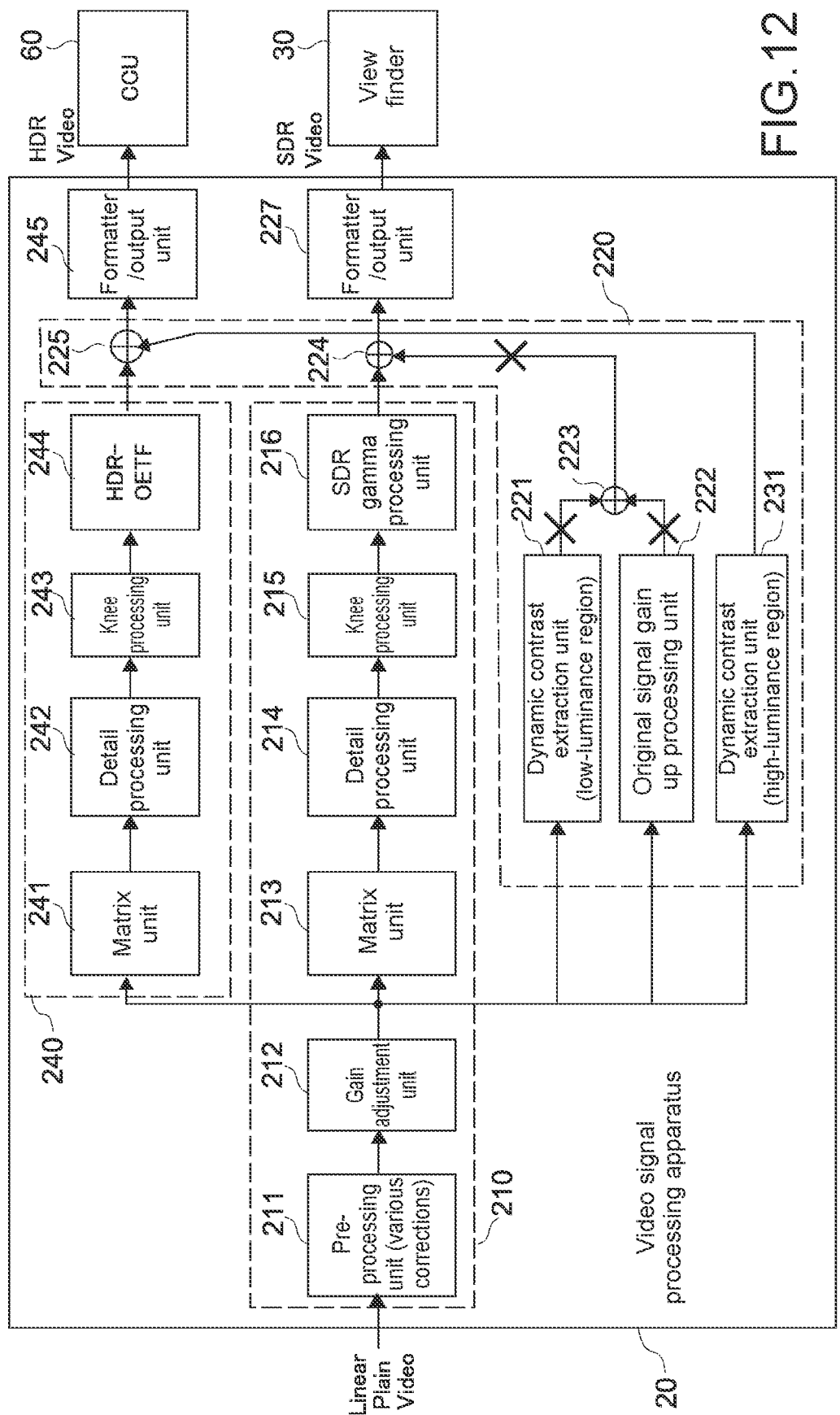
FIG. 12 A diagram showing a state of the video signal processing apparatus 20 on a contrast emphasis mode for a high-luminance region.

FIG. 12 is a diagram showing a state of the video signal processing apparatus 20 on the contrast emphasis mode for the high-luminance region. On the contrast emphasis mode for the high-luminance region, the dynamic contrast extraction unit 231 for the high-luminance region is set by the control unit 50 to generate a contrast emphasis signal of the region belonging to the higher-luminance side with respect to the knee correction point, for example, the highest-luminance region. Both the dynamic contrast extraction unit 221 for the low-luminance region and the original signal gain up processing unit 222 are turned off. Accordingly, the HDR video signal to which the contrast emphasis signal of the highest-luminance region is added is obtained, and it is possible to avoid blown-out highlights in a scenario with strong light or the like and it is easy to improve the visibility of the high-luminance region and adjust the focus on the high-luminance region.

(Contrast Emphasis Mode for Region Other than High-Luminance Region)

The contrast emphasis mode for the region other than the high-luminance region is a mode of adding contrast components of a region other than the highest-luminance region in the region on the higher-luminance side with respect to the knee correction point and the region on the lower-luminance side with respect to the knee correction point to the video signal generated by the third video processing unit 240 and the luminance reduction video signal output from the first video processing unit 210. This mode is used especially in a scenario with the fog or the like. Fog tends to increase the luminance of the video signal. Therefore, if the contrast of a foggy region in video is emphasized, the focus is put on the fog. It is a mode used for avoiding such a situation.

Figure 13:
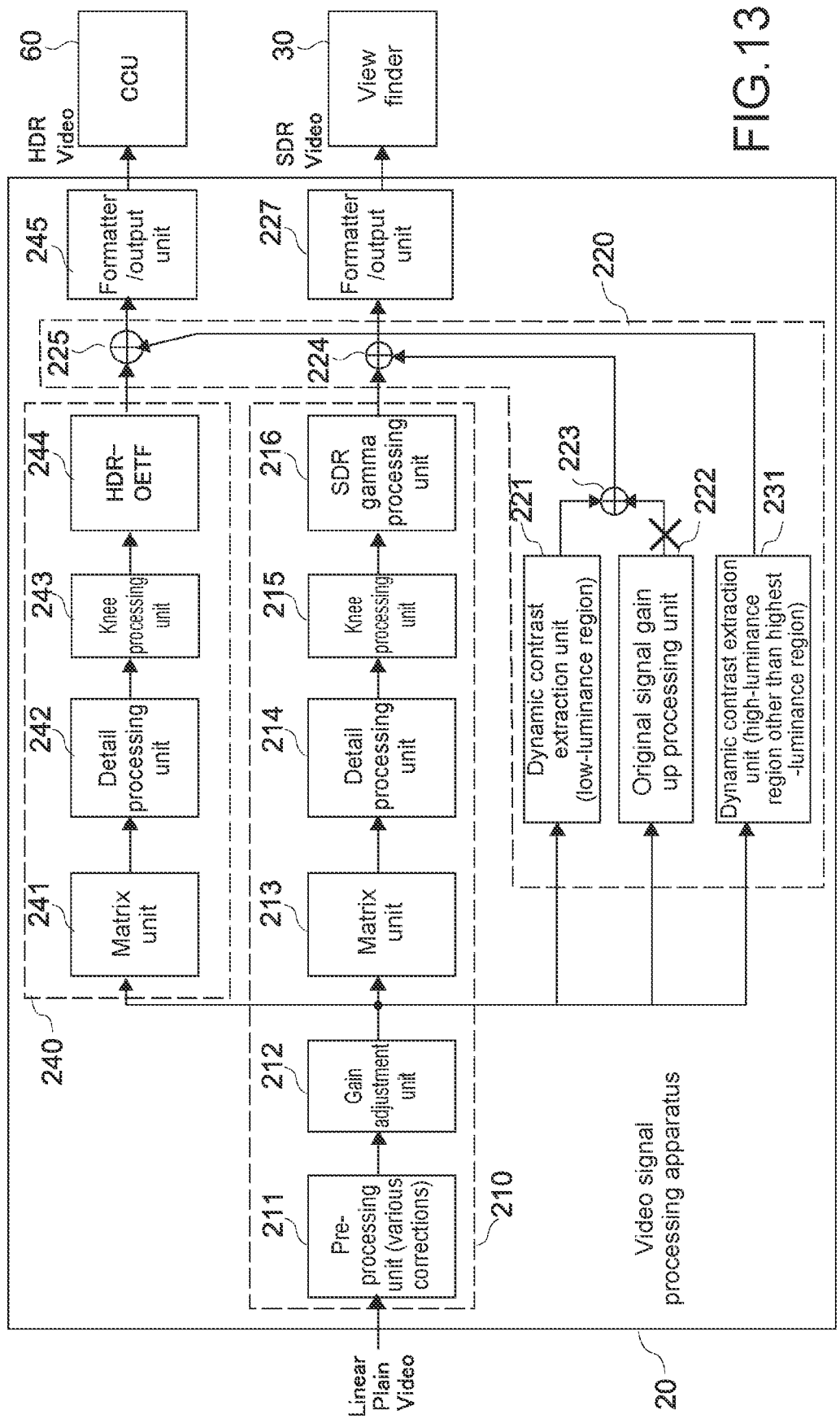
FIG. 13 A diagram showing a state of the video signal processing apparatus 20 on a contrast emphasis mode for a region other than the high-luminance region.

FIG. 13 is a diagram showing a state of the video signal processing apparatus 20 on this contrast emphasis mode for the region other than the high-luminance region. On the contrast emphasis mode for the region other than the high-luminance region, the dynamic contrast extraction unit 221 for the low-luminance region is set by the control unit 50 to generate a contrast emphasis signal of the region on the lower-luminance side with respect to the knee correction point. On the other hand, the dynamic contrast extraction unit 231 for the high-luminance region is set by the control unit 50 to generate a contrast emphasis signal of the region other than the highest-luminance region in the region on the higher-luminance side with respect to the knee correction point. The original signal gain up processing unit 222 is turned off. The contrast emphasis signal generated by the dynamic contrast extraction unit 221 for the low-luminance region is added to the luminance reduction video signal output by the first video processing unit 210. The contrast emphasis signal generated by the dynamic contrast extraction unit 231 for the high-luminance region is added to the video signal generated by the third video processing unit 240. Accordingly, it is possible to avoid blurring of video caused by the focus adjusted on the fog in the video.

(Contrast Emphasis Mode for Low-Luminance Region)

The contrast emphasis mode for the low-luminance region is a mode of adding contrast components of the low-luminance region and the gain up signal to the luminance reduction video signal output by the first video processing unit 210. This mode corresponds to the above-mentioned first embodiment.

(Contrast Emphasis Mode for High-Luminance Region+ Low-Luminance Region)

The contrast emphasis mode for the high-luminance region+the low-luminance region is equivalent to the one described in the first modified example. On this mode, the dynamic contrast extraction unit 221 for the low-luminance region is set by the control unit 50 to generate a contrast emphasis signal of the region on the lower-luminance side with respect to the knee correction point. On the other hand, the dynamic contrast extraction unit 231 for the high-luminance region is set by the control unit 50 to generate an information signal of a high-luminance change component of a region belonging to the higher-luminance side with respect to the knee correction point, for example, the highest-luminance region as the contrast emphasis signal. The original signal gain up processing unit 222 is turned on. This mode can improve the visibility of the video of both the region on the lower-luminance side with respect to the knee correction point and the region on the higher-luminance side. Note that on this mode, the region on the higher-luminance side for which the contrast emphasis signal is generated is not necessarily the highest-luminance region. For example, it may be a middle-luminance region or the like in the region on the higher-luminance side with respect to the knee correction point, a region belonging to the higher-luminance side.

It should be noted that the present technology may also take the following configurations.

(1) A video signal processing apparatus, including:
a first video signal processing unit that generates, from a pixel signal obtained by an imaging unit capable of obtaining a pixel signal with a first dynamic range, a luminance reduction video signal with a second dynamic range narrower than the first dynamic range; and
a second video signal processing unit that generates, from the pixel signal, an information signal of a luminance change component of a luminance region of the luminance reduction video signal and a gain up signal of a pixel signal of the luminance region and adds the information signal and the gain up signal to the luminance reduction video signal.

(2) The video signal processing apparatus according to (1), in which
the first video signal processing unit is configured to generate, from the pixel signal, the luminance reduction video signal by knee processing.

(3) The video signal processing apparatus according to (1) or (2), in which
the second video signal processing unit is configured to generate the gain up signal by multiplying the pixel signal of the luminance region of the luminance reduction video signal by a gain determined in accordance with a luminance value of the pixel signal.

(4) The video signal processing apparatus according to any one of (1) to (3), in which
the first dynamic range is a high dynamic range (HDR), and
the second dynamic range is a standard dynamic range (SDR).

(5) The video signal processing apparatus according to any one of (1) to (4), further including
a first output unit that outputs an output video signal generated by the second video signal processing unit.

(6) The video signal processing apparatus according to (5), in which
the first output unit is configured to output the output video signal to a view finder.

(7) The video signal processing apparatus according to any one of (1) to (6), in which
the second video signal processing unit is further configured to generate, from the pixel signal, the information signal of the luminance change component of the luminance region of the luminance reduction video signal and generate an information signal of a luminance change component of a region belonging to a higher-luminance side as compared to the luminance region of the luminance reduction video signal.

(8) The video signal processing apparatus according to (7), in which the second video signal processing unit is configured to add the generated information signal of the luminance change component of the region belonging to the higher-luminance side with the information signal of the luminance change component of the luminance region of the luminance reduction video signal and the gain up signal of the pixel signal of the luminance region to the luminance reduction video signal.

(9) The video signal processing apparatus according to any one of (1) to (8), further including
a third video signal processing unit that generates, from the pixel signal obtained by the imaging unit, a video signal with the first dynamic range.

(10) The video signal processing apparatus according to (9), further including
a second output unit that outputs the video signal with the first dynamic range.

(11) The video signal processing apparatus according to (9), in which
the second video signal processing unit is configured to generate, from the pixel signal, an information signal of a luminance change component of a region belonging to a higher-luminance region as compared to the luminance region of the luminance reduction video signal and further add the information signal to the video signal with the first dynamic range.

(12) A video signal processing method, including:
generating, from a pixel signal obtained by an imaging unit capable of obtaining a pixel signal with a first dynamic range, a luminance reduction video signal with a second dynamic range narrower than the first dynamic range; and
generating, from the pixel signal, an information signal of a luminance change component of a luminance region of the luminance reduction video signal and a gain up signal of a pixel signal of the luminance region and adding the information signal and the gain up signal to the luminance reduction video signal.

(13) The video signal processing method according to (12), further including
generating, from the pixel signal, the luminance reduction video signal by knee processing.

(14) The video signal processing method according to (12) or (13), further including
generating the gain up signal by multiplying the pixel signal of the luminance region of the luminance reduction video signal by a gain determined in accordance with a luminance value of the pixel signal.

(15) The video signal processing method according to any one of (12) to (14), in which
the first dynamic range is a high dynamic range (HDR), and
the second dynamic range is a standard dynamic range (SDR).

(16) The video signal processing method any one of (12) to (15), further including
outputting an output video signal generated by the second video signal processing unit.

(17) The video signal processing method according to (16), further including
outputting the output video signal to a view finder.

(18) The video signal processing method according to any one of (12) to (17), further including
generating, from the pixel signal, the information signal of the luminance change component of the luminance region of the luminance reduction video signal and generating an information signal of a luminance change component of a region belonging to a higher-luminance side as compared to the luminance region of the luminance reduction video signal.

(19) The video signal processing method according to (18), further including
adding the generated information signal of the luminance change component of the region belonging to the higher-luminance side with the information signal of the luminance change component of the luminance region of the luminance reduction video signal and the gain up signal of the pixel signal of the luminance region to the luminance reduction video signal.

(20) The video signal processing method according to any one of (12) to (19), further including
generating, from the pixel signal obtained by the imaging unit, a video signal with the first dynamic range.

(21) The video signal processing method according to (20), further including
outputting the video signal with the first dynamic range.

(22) The video signal processing method according to (20), further including
generating, from the pixel signal, an information signal of a luminance change component of a region belonging to a higher-luminance region as compared to the luminance region of the luminance reduction video signal and further add the information signal to the video signal with the first dynamic range.

(23) An imaging apparatus, including:
an imaging unit capable of obtaining a pixel signal with a first dynamic range;
a first video signal processing unit that generates, from the pixel signal obtained by the imaging unit, a luminance reduction video signal with a second dynamic range narrower than the first dynamic range; and
a second video signal processing unit that generates, from the pixel signal, an information signal of a luminance change component of a luminance region of the luminance reduction video signal and a gain up signal of a pixel signal of the luminance region and adds the information signal and the gain up signal to the luminance reduction video signal.

(24) The imaging apparatus according to (23), in which
the first video signal processing unit is configured to generate, from the pixel signal, the luminance reduction video signal by knee processing.

(25) The imaging apparatus according to (23) or (24), in which
the second video signal processing unit is configured to generate the gain up signal by multiplying the pixel signal of the luminance region of the luminance reduction video signal by a gain determined in accordance with a luminance value of the pixel signal.

(26) The imaging apparatus according to any one of (23) to (25), in which
the first dynamic range is a high dynamic range (HDR), and
the second dynamic range is a standard dynamic range (SDR).

(27) The imaging apparatus according to any one of (23) to (26), further including
a first output unit that outputs an output video signal generated by the second video signal processing unit.

(28) The imaging apparatus according to (27), in which
the first output unit is configured to output the output video signal to a view finder.

(29) The imaging apparatus according to any one of (23) to (28), in which the second video signal processing unit is further configured to generate, from the pixel signal, the information signal of the luminance change component of the luminance region of the luminance reduction video signal and generate an information signal of a luminance change component of a region belonging to a higher-luminance side as compared to the luminance region of the luminance reduction video signal.

(30) The imaging apparatus according to (29), in which the second video signal processing unit is configured to add the generated information signal of the luminance change component of the region belonging to the higher-luminance side with the information signal of the luminance change component of the luminance region of the luminance reduction video signal and the gain up signal of the pixel signal of the luminance region to the luminance reduction video signal.

(31) The imaging apparatus according to any one of (23) to (30), further including
a third video signal processing unit that generates, from the pixel signal obtained by the imaging unit, a video signal with the first dynamic range.

(32) The imaging apparatus according to (31), further including
a second output unit that outputs the video signal with the first dynamic range.

(33) The imaging apparatus according to (31), in which the second video signal processing unit is configured to generate, from the pixel signal, an information signal of a luminance change component of a region belonging to a higher-luminance region as compared to the luminance region of the luminance reduction video signal and further add the information signal to the video signal with the first dynamic range.

REFERENCE SIGNS LIST 10 imaging unit
20 video signal processing method
30 view finder
210 first video signal processing unit
220 second video signal processing unit
221 dynamic contrast extraction unit
222 original signal gain up processing unit

The invention claimed is:
1. A video signal processing apparatus, comprising:
circuitry configured to
  obtain a pixel signal having a first dynamic range,
  generate, from the obtained pixel signal, a luminance reduction video signal having a second dynamic range that is narrower than the first dynamic range,
  generate, from the pixel signal, both
    a low-luminance contrast emphasis signal representing a luminance change component of a low-luminance region of the luminance reduction video signal, and
    a low-luminance gain up signal obtained by multiplying the pixel signal of the low-luminance region by a gain determined in accordance with a luminance value of the pixel signal,
  add the low-luminance contrast emphasis signal and the low-luminance gain up signal to the luminance reduction video signal to output an enhanced video signal,
  generate, from the pixel signal, an information signal of a luminance change component of a region having a luminance higher than the low-luminance region, and
  add the information signal of the higher-luminance region together with the low-luminance contrast emphasis signal and the low-luminance gain up signal to the luminance reduction video signal.

2. The video signal processing apparatus according to claim 1,
wherein the circuitry generates the luminance reduction video signal by performing knee processing.

3. The video signal processing apparatus according to claim 2,
wherein the gain used to generate the low-luminance gain up signal is a variable gain that decreases as the luminance value of the pixel signal increases within the low-luminance region.

4. The video signal processing apparatus according to claim 3,
wherein the first dynamic range is a high dynamic range (HDR), and
wherein the second dynamic range is a standard dynamic range (SDR).

5. The video signal processing apparatus according to claim 4,
wherein the circuitry is further configured to control output of the enhanced video signal.

6. The video signal processing apparatus according to claim 5,
wherein the circuitry controls output of the enhanced video signal to a view finder.

7. The video signal processing apparatus according to claim 1,
wherein the circuitry is further configured to generate, from the pixel signal, a video signal having the first dynamic range.

8. The video signal processing apparatus according to claim 7,
wherein the circuitry is further configured to control output of the video signal having the first dynamic range.

9. The video signal processing apparatus according to claim 7,
wherein the circuitry is further configured to
  generate, from the pixel signal, an information signal of a luminance change component of a region having a luminance higher than the low-luminance region, and
  add the information signal to the video signal having the first dynamic range.

10. A video signal processing method, comprising:
generating, from a pixel signal obtained by an imaging unit and having a first dynamic range, a luminance reduction video signal having a second dynamic range narrower than the first dynamic range;
generating, from the pixel signal, both
  a low-luminance contrast emphasis signal representing a luminance change component of a low-luminance region of the luminance reduction video signal, and
  a low-luminance gain up signal obtained by multiplying the pixel signal of the low-luminance region by a gain determined in accordance with a luminance value of the pixel signal;

adding the low-luminance contrast emphasis signal and the low-luminance gain up signal to the luminance reduction video signal to output an enhanced video signal;

generating, from the pixel signal, an information signal of a luminance change component of a region having a luminance higher than the low-luminance region; and adding the information signal of the higher-luminance region together with the low-luminance contrast emphasis signal and the low-luminance gain up signal to the luminance reduction video signal.

11. An imaging apparatus, comprising:

an imaging unit configured to obtain a pixel signal with a first dynamic range; and circuitry configured to
  generate, from the pixel signal obtained by the imaging unit, a luminance reduction video signal having a second dynamic range narrower than the first dynamic range,
  generate, from the pixel signal, both
    a low-luminance contrast emphasis signal representing a luminance change component of a low-luminance region of the luminance reduction video signal, and
    a low-luminance gain up signal obtained by multiplying the pixel signal of the low-luminance region by a gain determined in accordance with a luminance value of the pixel signal,
  add the low-luminance contrast emphasis signal and the low-luminance gain up signal to the luminance reduction video signal to output an enhanced video signal,
  generate, from the pixel signal, an information signal of a luminance change component of a region having a luminance higher than the low-luminance region, and
  add the information signal of the higher-luminance region together with the low-luminance contrast emphasis signal and the low-luminance gain up signal to the luminance reduction video signal.

* * * * *